United States Patent
Gaddam et al.

(10) Patent No.: US 9,037,118 B2
(45) Date of Patent: May 19, 2015

(54) METHOD OF DEVICE AUTHENTICATION AND APPLICATION REGISTRATION IN A PUSH COMMUNICATION FRAMEWORK

(71) Applicant: Cellco Partnership, Basking Ridge, NJ (US)

(72) Inventors: Venkateswara R. Gaddam, Bridgewater, NJ (US); Shahid Ahmed, Monmouth Junction, NJ (US); Sankar Shanmugam, Dayton, NJ (US); S M Masudur Rahman, Edison, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/175,393

(22) Filed: Feb. 7, 2014

(65) Prior Publication Data

US 2014/0194097 A1   Jul. 10, 2014

Related U.S. Application Data

(62) Division of application No. 13/216,952, filed on Aug. 24, 2011, now Pat. No. 8,649,768.

(51) Int. Cl.
| | |
|---|---|
| *H04M 3/42* | (2006.01) |
| *H04W 12/06* | (2009.01) |
| *H04M 3/38* | (2006.01) |
| *H04L 29/08* | (2006.01) |
| *H04L 29/06* | (2006.01) |

(52) U.S. Cl.
CPC .............. *H04W 12/06* (2013.01); *H04M 3/38* (2013.01); *H04L 67/26* (2013.01); *H04L 63/08* (2013.01)

(58) Field of Classification Search
CPC ..... H04L 67/26; H04L 65/4061; H04L 63/08; H04L 67/2819; H04L 12/1859; H04L 67/20; H04W 4/10; H04W 12/06; H04W 76/005; H04W 88/16

See application file for complete search history.

(56) References Cited

U.S. PATENT DOCUMENTS 8,407,776 B2 * 3/2013 Somani et al. ............... 726/9
2006/0230154 A1 10/2006 Nguyenphu et al.

(Continued)

OTHER PUBLICATIONS

Google Projects for Android: C2DM (Labs), Android Cloud to Device Messaging Framework, <http://code.google.com/android/c2dm/index.html> accessed on Aug. 22, 2011.

(Continued)

*Primary Examiner* — Liton Miah

(57) ABSTRACT

A server system and a mobile device establish a push data framework for communication. The mobile device includes a push client, and runs one or more applications requiring push data communications. The push client transmits a device authentication and application validation request to a push server. Upon the push server successfully authenticating and validating the device and application, the push client receives a session identifier for establishing a persistent communication connection with the push server. Once established, an application server can push data to the mobile device via the persistent communication session. The session identifier remains valid for an extended period of time, and allows the push client to maintain and re-establish push connections with the push server for the duration of the extended period of time.

20 Claims, 7 Drawing Sheets

(56) References Cited

U.S. PATENT DOCUMENTS

| | | |
|---|---|---|
| 2007/0239884 A1 | 10/2007 | Karmakar et al. |
| 2007/0286159 A1 | 12/2007 | Preiss et al. |
| 2009/0158397 A1 | 6/2009 | Herzog et al. |
| 2010/0138501 A1 | 6/2010 | Clinton et al. |
| 2010/0227632 A1* | 9/2010 | Bell et al. ............... 455/466 |
| 2011/0053568 A1 | 3/2011 | Christianson et al. |
| 2011/0173681 A1* | 7/2011 | Qureshi et al. ............ 726/4 |
| 2012/0042004 A1* | 2/2012 | Shenfield ................. 709/203 |
| 2012/0198268 A1* | 8/2012 | Qureshi ................... 714/4.1 |

OTHER PUBLICATIONS

Local and Push Notification Programming Guide: Apple Push Notification Service, <http://developer.apple.com/library/ios/#documentation/NetworkingInternet/Conceptual/RemoteNotificationsPG/ApplePushService/ApplePushService.html>, accessed Aug. 22, 2011.

Entire prosecution history of U.S. Appl. No. 13/216,952, entitled "Method of Device Authentication and Application Registration in a Push Communication Framework," filed Aug. 24, 2011, now U.S. Patent No. 8,649,768, issued Feb. 11, 2014.

* cited by examiner

METHOD OF DEVICE AUTHENTICATION AND APPLICATION REGISTRATION IN A PUSH COMMUNICATION FRAMEWORK

TECHNICAL FIELD

The present subject matter relates to techniques and equipment to allow a server system to authenticate a mobile device for push data services, register an application running on the mobile device that requests push services, and establish a persistent connection session over which the system pushes data communications to the mobile device while maintaining the mobile device authentication and application registration.

BACKGROUND

In recent years, various methodologies have been developed to enable service provider servers to initiate the sending of data and notifications to smartphones or other mobile devices.

Modern networks and many mobile devices support wireless packet data communication to and from the mobile devices. These capabilities offer users a wide range of desirable communication features, such as email, web surfing, application selection and downloading, media content selection and downloading, etc. For many of the features or services, the mobile devices generally operate as clients with respect to service provider servers, and the mobile devices must themselves initiate all data communications with the service provider servers. As a result, if a service provider or other server wants to send a notification or other data communication to a mobile device, the server must wait for the mobile device to establish a data communication connection with the server. To enable more timely data communication to mobile devices, service providers have developed workaround methods to enable the service provider servers to indirectly initiate data communications with mobile devices. The workaround methods rely on short message service (SMS) messages to provide the mobile device with the notification, or to cause the mobile device to establish a data communication connection with the server.

FIG. 1 illustrates a block diagram of a prior-art system which relies on short message service (SMS) or SMS-type services to send notifications from servers to mobile devices. Mobile device 101 includes a user interface 111, one or more applications 113, and a communication interface 117. Via the interface 117, the mobile device 101 is in communication with a carrier gateway 107 over a wireless network (not shown).

The mobile device 101 operates using a pull communication framework. As a result, mobile device 101 itself initiates requests for transmission to/from gateway 107 and application server 105. If an application 113 or other program running on mobile device 101 requires a connection with an application server 105, the application 113 transmits a request to communication interface 117. In response to the request, the communication interface 117 establishes, a connection with carrier gateway 107. After authentication/validation of the mobile device 101 and the application 113 with the carrier gateway 107, the interface 117 connects to the application server 105. Once the connection to application server 105 is established, the application 113 and application server 105 exchange data over the connection. Typically, the client application requests information and the server sends the request information in a response. The request and response is termed a "pull" communication because the client is effectively "pulling" down data from the server.

A "push" communication is one in which the server has data to send and initiates the communication session and transmission of the data to the client, without a client request. Some push traffic relates to notifications, but other push traffic can include other types of data such as software and content downloads. However, because mobile device 101 operates using a pull notification framework, application server 105 cannot directly initiate requests for transmission to/from mobile device 101. Instead, application server 105 relies on a workaround method to send notifications to mobile device 101. In response to a notification, the mobile device 101 initiates communication to pull down the data.

If application server 105 or any other application or carrier server requires a connection to mobile device 101, the application server 105 transmits a request to carrier gateway 107. In response to receiving the request, carrier gateway 107 forwards the request to a short message service center (SMSC) 119 to format the request into a short messaging service (SMS) type message and transmit the SMS message to the mobile device 101. Upon receipt of the SMS message, the mobile device 101 processes the received SMS message. If the SMS message includes a request for an application 113 to establish a connection with an application server 105, the request results in the application 113 transmitting a request to communication interface 117 to establish a connection with application server 105. In response to the request, communication interface 117 establishes a connection with carrier gateway 107 and, after authentication/validation of mobile device 101 and application 113 with the carrier gateway 107, connects to application server 105. Once the connection to application server 105 is established, the application 113 and application server 105 exchange data over the connection.

The method described above enables an application server 105 to establish a connection with mobile device 101 by using SMS or SMS-type capabilities of the mobile device and carrier network. As a result, the workaround method requires additional carrier equipment and capabilities such as SMS-related hardware and software, which may come at added cost to the provider. The method is subject to limitations of SMS or other messaging, which may constrain the length, format, or content of notifications sent to the mobile device 101 (e.g., messages may be limited to being no more than 140 ASCII characters).

In cases in which the SMS notification causes the mobile device to establish a communication channel with the server, the mobile device, the associated subscriber account, and the requesting application need to be authenticated and/or validated each time a channel is established. The establishment of each new connection requires device and/or application authentication and validation, resulting in additional loading on the communication network, carrier gateway 107, and other network facilities and servers such as authentication servers. Server-initiated notifications are becoming more widespread, as mobile devices increasingly run multiple concurrent applications each requiring push notifications, and the increased usage of server-initiated notifications is straining network and communication resources as the devices and applications need to be re-authenticated and/or re-validated by the server with increasing frequency. As a result, the SMS-type workaround presents a strain on carrier network servers and communication resources.

Hence a need exists for more efficient techniques to enable server-initiated communications with mobile devices. A further need exists for techniques to enable server-initiated communications that do not require repeated authentication and validation of mobile devices and applications each time a connection is established.

SUMMARY

The teachings herein alleviate one or more of the above noted problems with techniques and equipment to allow a push communication server system to authenticate a mobile device, register an application running on the mobile device that requests push services, and establish a persistent session during which the system maintains the mobile device authentication and application registration. If the link between the mobile device and the server system is dropped, lost, or terminated, the persistent connection is re-established without repeating the device authentication and application registration.

A system for pushing data communication to a mobile device through a mobile communication network is configured to establish a push connection with the mobile device running an application. The system receives a request from a push client running on the mobile device to establish a push connection for the application running on the mobile device, the request including an identifier of the mobile device and an identifier of the application. The system authenticates the mobile device upon determining that the identifier of the mobile device is valid, registers the application upon determining that the identifier of the application is valid, and assigns a session identifier to the authenticated mobile device. The system then establishes a persistent communication session associated with the session identifier between the system and the mobile device, through the mobile communication network, and sends at least one push communication for the application via the established communication session to the mobile device running the application.

If a first wireless data link between the system and the mobile device is lost or terminated, a new wireless data link is established, and a new persistent communication session associated with the session identifier is established between the system and the mobile device. The new persistent connection is used to send at least one push communication to the application on the mobile device.

The system for pushing data communication through a mobile network to a mobile device is further configured to receive, through the mobile communication network, requests from a push client running on a mobile device, each request being to establish a push connection for a respective application on the mobile device, and each request including an identifier of the mobile device and an identifier of the respective application. In response to each request, the system assigns and stores a session identifier to register the respective mobile device, and establishes a persistent communication session associated with the session identifier between the server and the respective mobile device. The system receives a query from the push client, the query including the identifier of the mobile device, and in response to the query, transmits a response containing the session identifier of a session associated with the identifier of the mobile device included in the query and the identifiers of registered applications assigned to the respective session identifiers.

If at least one session identifier has expired, the system assigns a new session identifier and transmits a response containing the new session identifier.

A device for receiving push data communication through a mobile network from a push server system receives, in a push client running on the mobile device, a first request from an application running on the mobile device to establish a push connection for the application with a push server system through the mobile communication network, the first request including an identifier of the application. The device generates and transmits through the mobile communication network a second request to establish the push connection for the application with the push server system, the second request including the identifier of the application and an identifier of the mobile device. The device receives a confirmation message from the push server system, the confirmation message including a session identifier for a persistent communication session established between the push server and the mobile device. The device then receives at least one push communication for the application from the push server system via the established communication session through the mobile communication network.

If a first wireless data link between the mobile device and the push server system is lost or terminated, a new wireless data link is established, and at least one push communication for the application is received from the push server through the new wireless data link.

As a result, persistent connections corresponding to the session identifier can be re-established between the mobile device and the server system by using the session identifier without repeating the device authentication and application validation.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various system and techniques disclosed herein relate to device authentication and application registration in a push data communication framework.

A push communication framework allows a server to initiate a request for a given transaction with a client device, such as a mobile device communicating with the server. As a result, in the push communication framework, the server can initiate data communications with the client through an established push data connection session. The client may also initiate communications with the server.

Figure 2:
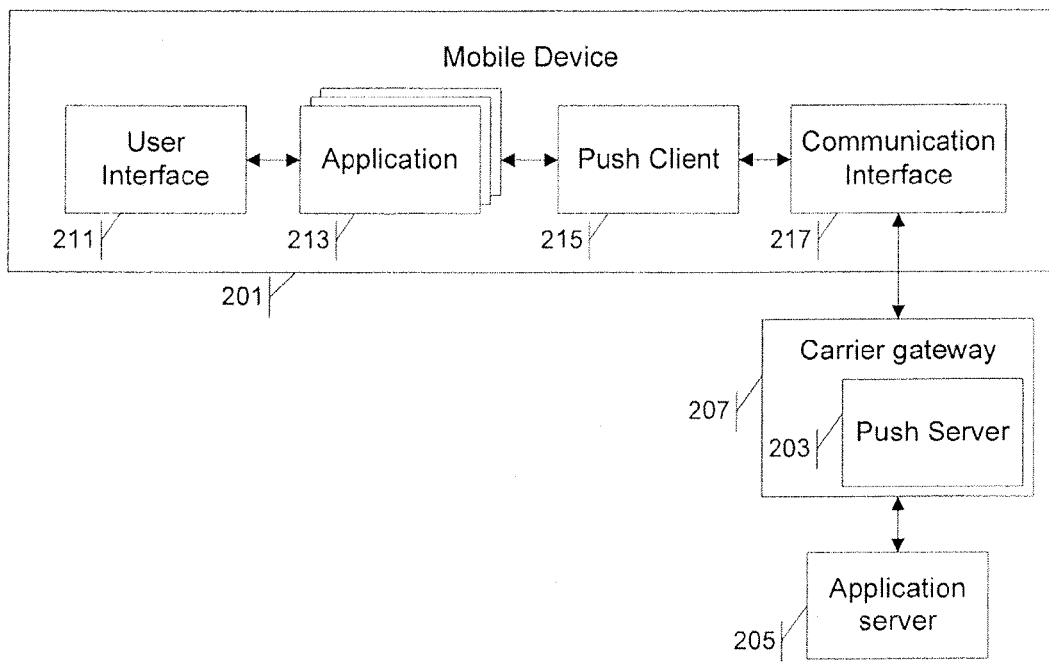
FIG. 2 is a general block diagram of a system for providing device authentication and application registration in a push data communication framework.

Reference now is made in detail to the examples illustrated in the accompanying drawings and discussed below. FIG. 2 is a general block diagram of a push data communication framework.

Figure 1:
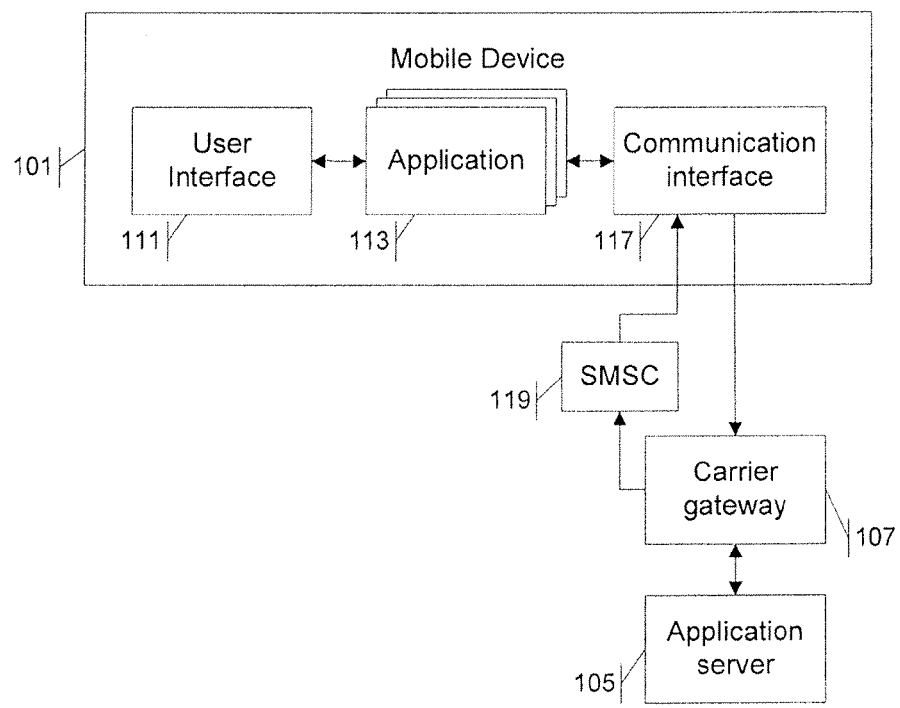
FIG. 1 is a general block diagram of a prior-art system using short message service capabilities to send notifications to mobile devices.

FIG. 2 shows a mobile device 201 generally similar to mobile device 101 presented in FIG. 1. Mobile device 201 establishes a wireless communication network link with carrier gateway 207, and is in communication with carrier gateway 207 over the wireless link through a wireless network of a wireless network carrier. The mobile device 201 links to the carrier gateway 207 to access the carrier network and connect to voice, data, or other services offered by the network carrier and/or other service providers. The carrier gateway 207 may be a base station, network switch, and/or gateway server. The gateway 207 authenticates the mobile device and, upon successful authentication, allows the mobile device to access network provided communication services. Only one gateway 207 is shown for convenience, although there may be any number of such gateways in or coupled to the wireless communication network. The mobile device 201 may be a cellphone, smart-phone, or other mobile device capable of communicating with and connecting to carrier gateway 207 over the wireless carrier network or other appropriate network (e.g., a WIFI network providing network connectivity to the carrier network). In one example, the mobile device 201 automatically links to the carrier gateway 207 as soon as the device powers on and/or enters a service area of the carrier gateway.

Mobile device 201 includes a communication interface 217 for communicating with the wireless network. For data services, the interface enables the mobile device 201 to communicate through the network with the carrier gateway 207. The mobile device also includes one or more elements and programming for providing a user interface 211 for receiving input from a user and presenting information to the user. Also, one or more applications 213 run on the mobile device 201. The applications 213 receive and/or transmit input/output commands and/or data using user interface 211, other programming, and communication interface 217. In particular, communication interface 217 allows applications 213 to connect to application servers 205 to send data to or receive data from the application servers 205. For communications with a server 205, an application 213 functions as a client or client application.

Mobile device 201 additionally includes a push client 215, while carrier gateway 207 includes a push server 203. Push client 215 and push server 203 provide push data communication capabilities to mobile device 201 and carrier gateway 207.

Push client 215 is a software application running on and/or a hardware module located in mobile device 201 that provides push data communication functionality to other applications on the mobile device 201. Push client 215 interfaces with communication interface 217 to establish a persistent connection to the push server 203 of the carrier gateway 207. When the mobile device 201 establishes a network link with the carrier gateway 207, for example upon powering on of mobile device 201 or entering a wireless service area, the push client 215 can be configured to automatically establish a persistent connection with push server 203. Alternatively, push client 215 can be configured to automatically establish a persistent connection with push server 203 when one or more client applications 213 running on client device 201 request push communication functionality. The persistent connection enables push client 215 to initiate a transmission with or send a notification or request to push server 203 without having to establish a new connection session for each transmission, and further enables push server 203 to directly initiate a transmission with or send a notification or request to push client 215 without relying on SMS or other network capabilities.

Push server 203 maintains the persistent connection with push client 215, and uses the persistent connection to transmit data, messages, notifications, or other downlink push transmissions from application server(s) such as 205 to push client 215 on the mobile device 201. A push transmission can include a notification, request or instruction, data, or other transmission for the mobile device 201, for an application 213 running on the mobile device 201, and/or for a user of the mobile device 201. The push transmission can include data of any type or length (e.g., a data, audio, video, or other file; an executable program; a software application program or update; a mobile device or application configuration file; or the like). Push client 215 receives the push transmissions from push server 203, identifies the target recipient of the transmission (e.g., a target recipient application), ensures that the target recipient is able to receive the transmission (e.g., by waking-up or beginning execution of the target recipient if necessary), and forwards the transmission to the target recipient.

For example, the mobile device 201 may run a weather forecast application which provides up-to-date weather information and weather alerts to a user of the mobile device 201. Upon beginning execution, the weather forecast application requests the push client 215 to establish a push communication connection with the push server 203. The push communication connection can then be used by the push server 203 to provide the application running on the device 201 with push notifications received from a weather forecast application server 205 associated with the application. In response to the request, push client 215 establishes a persistent connection with push server 203. The persistent connection is then used by the push server 203 to automatically provide updated weather forecasts and weather alerts, received by the push server 203 from the weather forecast application server 205, to the weather forecast application running on device 201. The application server 205 can provided updates on a periodic basis, and/or whenever updated forecasts and alerts are available on the server 205. The updates are provided by server 205 through push server 203 using push data communications through the persistent connection, without requiring any request on the part of the weather forecast application, push client 215, or mobile device 201. The persistent connection can also be used by the weather forecast application, push client 215, or mobile device 201 to transmit data to the push server 203 and/or the application server 205, for example to transmit a confirmation of receipt of push data. In one example, the persistent connection can also be used to by the weather forecast application, a push client 215, or a mobile device 201 to transmit to the push server 203 and/or application server 205 updated user preference, location, or other data used for personalizing weather updates and alerts. In some situations, the application server 205 additionally stores a user account associated with the mobile device 201, and sends to the mobile device 201 weather updates and alerts that are related to data stored in the user account (e.g., updates related to a location associated with the user account).

Push client 215 is also configured to receive requests and/or notifications from applications 213 running on mobile device 201, and to either respond to the requests and notifications or transmit the requests and notifications to the push server 203 or to an application server 205. Push client 215 can be configured to respond to requests from applications 213 inquiring about or verifying their connection status with push server 203 or application server 205, or from applications 213 inquiring about new notifications or data from servers 203/205. For example, because push client 215 maintains a persistent connection with push server 203 to automatically receive push data communications from servers 203/205, push client 215 may be configured to automatically respond to pull-type requests from application 213 such as periodic requests to check for new data or messages on servers 203/205 without contacting servers 203/205. The automatic response from push client 215 may thus reduce the number of requests received by servers 203/205, and thus reduce the communication network and the servers' communication and processing loads. Push client 215 can also be configured to forward or transmit other requests from applications 213 to push server 203 and/or application server 205.

Figure 3:
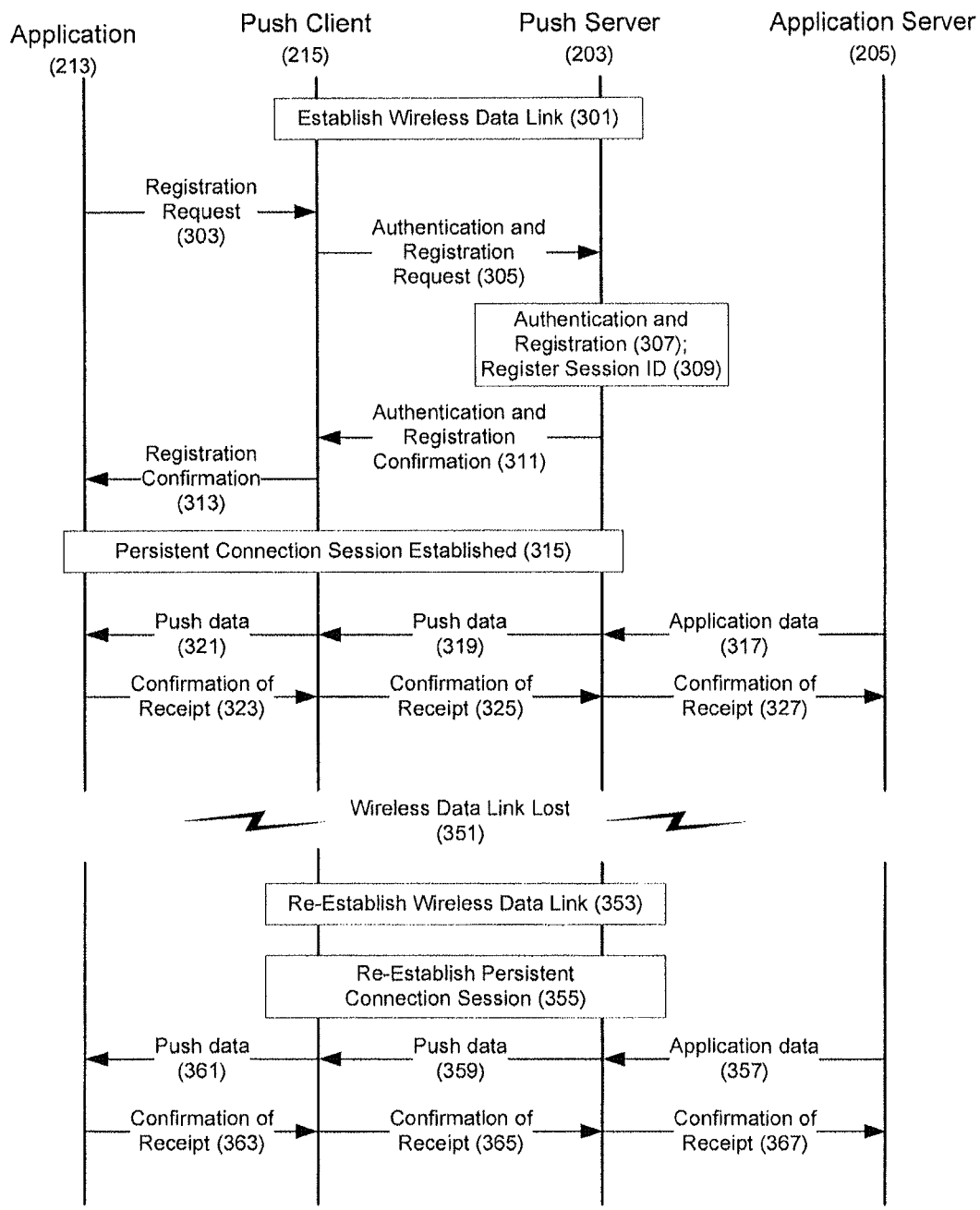
FIG. 3 is a signal flow diagram between a client device and network servers for performing authentication and registration for push data functionality.

While the general functionality of push client 215 and push server 203 have been described with reference to FIG. 2, device authentication and application registration methods used by the push client 215 and server 203 for subsequent data communications are described in more detail with reference to FIG. 3 below. FIG. 3 is a signal diagram showing signal flow between programs on a client device and network servers for performing authentication and registration for push data communication functionality and subsequently exchanging data.

In the diagram of FIG. 3, a wireless data link from mobile device 201 running application 213 and push client 215 is established with carrier gateway 207 and/or a push server 203 through a carrier network at step 301. The data link is a wireless over the air interface between the mobile device 201 and the serving base station or wireless access point. From the base station or access point to the gateway, the communication may use wire, fiber, or other transport media. In addition to establishing a wireless data link, step 301 may include authenticating the mobile device 201 for service on the carrier network for voice, data, and/or other communication. Alternatively or additionally, the wireless data link can be established between mobile device 201 and push server 203 through a WIFI or other appropriate network at step 301. The data link can thus be a wireless over the air connection between the mobile device and a WIFI access point, and/or a wire, fiber, or other connection from the access point to the push server 203.

When a wireless data link between mobile device 201 and carrier gateway 207 is established, an application 213 running on mobile device 201 and requiring push communication functionality generates and transmits a push data communication registration request to push client 215 at step 303. The registration request may be generated in response to the mobile, device 201 powering on, and/or the application 213 beginning execution or activating functionalities requiring push communications. A registration request may also be generated by the mobile device 201 itself, by user input received through user interface 211, and/or by any software program or hardware element running on the mobile device 201. In general, the registration request will include an identifier (e.g., application ID) for the application 213 or other entity that generated the registration request, as well an identifier or address for a push server 203. In some examples, the registration request will also include an identifier or address for an application server 205 that the application having generated the request seeks connection to.

Push client 215 receives the registration request, and determines whether the registration request matches any existing connections that the push client 215 supports. For this purpose, push client 215 maintains a database of all connection sessions currently supported by the push client. Each connection session is identified by a unique session ID identifier. The mobile device 201 stores data associated with each session for use by the push client 215. The session ID can be a universally unique identifier generated by a time-based generator, and having an associated session lifetime indicating the time period during which the session ID remains valid. Data associated with the session includes the session ID and session lifetime, as well as other session data such as connection or communication parameters, and/or device or network parameters used in the connection session. If push client 215 determines that an existing connection matches the registration request, the push client 215 may send a registration confirmation message to application 213 including the session ID for the connection session.

If push client 215 determines that no connection matches the registration request, the push client generates and transmits an authentication and registration request to the push server at step 305. The authentication and registration request includes the received application ID, as well as one or more identifiers for the mobile device 201 and/or push client 215 transmitting the request. Examples of identifiers for the mobile device 201 include a mobile directory number (MDN), a mobile identification number (MIN), an international mobile subscriber identity number (IMSI), a hardware ID such as a mobile equipment identifier (MEID), indicators for the type and version of operating system and firmware running on the mobile device 201, indicators for the model type and number of the mobile device 201, and the like. Identifiers for the mobile device 201 also include connection parameters, such as the device IP address and connection type. Identifiers for the mobile device 201 can also include an encryption key for securely communicating with the device. In one example, the authentication and registration request includes the received application ID, as well as the MDN, the hardware ID (MEID), the device IP address, the connection type, the OS type, the firmware, the model number, and optionally the encryption key of the mobile device 201.

Upon receiving the authentication and registration request from the push client 215, the push server 203 determines that the request is for establishing a persistent connection over which to provide push data functionality. The push server 203 proceeds to authenticate the device 201 to determine whether the mobile device 201 is an authorized device and validate the requesting application to determine that the requesting application 213 is an authorized application at step 307.

In particular, the push server 203 authenticates the mobile device 201 using the one or more mobile device identifiers received in the authentication request. For example, the push server 203 may send an IP address received as part of the authentication request to an authentication server of the carrier network, receive an identifier for an MDN that is associated with the IP address in the authentication server, and verify that the identifier for the MDN received from the authentication server matches the MDN received in the authentication request. In addition, the push server 203 may send a received hardware ID to a billing server of the carrier network, receive an identifier for an MDN that is associated with the hardware ID in the billing server, and verify that the received identifier for the MDN matches the MDN received in the authentication request. The push server 203 further validates the application 213 having made the registration request using the application ID identifier received as part of the authentication request. For example, the push server 203 may send the application ID to an application validation server of the carrier network, and receive a response indicating whether or not the application is approved for use with push data functionality on the carrier network. The device authentication, billing, and application validation servers may run on the same platform and/or be incorporated in the push server, or one or more of those server functions may be implemented on other hardware platforms in communication with the gateway platform via a network.

Upon successful authentication of the mobile device 201 and validation of the application 213, the push server registers a session for the mobile device 201 at step 309. The registration includes generating and assigning a session ID identifier, and an associated session lifetime indicating a pre-specified period of time for which the session will be valid. The push server 203 maintains a database of all connection sessions currently supported for all mobile devices 201. Upon registration of the session, the push server 203 stores in its database the session ID identifier and data associated with the session, such as the session lifetime and the one or more mobile device identifiers (e.g., an MDN and/or hardware ID) received as part of the authentication and registration request. In general, a session ID is associated with a mobile device 201, and the same session ID and associated persistent connection is used to send all push communications from push server 203 to push client 215, regardless of the application 213 associated with the push communication. However, in some examples, a different session ID may be associated with each application 213 running on the mobile device 201 and requiring a persistent push data connection, such that multiple session IDs may be associated with one mobile device 201.

The push server 203 may also store a time at which the session ID was created in cases in which the session lifetime is indicated as a duration (e.g., 24 hours, or 72 hours) or time period (e.g., 1 day, or 3 days), and/or store a session end-time calculated by summing the session lifetime with the session creation time. In one example, each session ID is valid for an extended period of time (e.g., three days, or another period of time exceeding one day) from its creation, but may also remain valid for a longer period of time. When a session lifetime has expired and is no longer valid, a new session ID and lifetime can be created in the same manner as above in order to maintain a persistent connection open between the application, push client 215, push server 203, and/or application server 205. The session lifetime can be selected to balance security and network load considerations. A shorter session lifetime will increase connection security, as devices will need to be revalidated and issued new session IDs at shorter intervals. A longer session lifetime will decrease network traffic, as persistent connections need to be revalidated and issued new session IDs at longer intervals. The session lifetime is selected at the time of creation of a session ID, and the lifetime can be variably selected based on the particular mobile device 201 or application 213 making the request, based on security or network load considerations at the time of creation of the session ID, or on other appropriate considerations.

Following registration, the push server 203 transmits an authentication and registration confirmation message to the push client 215 including the session ID identifier and associated session lifetime at step 311. Additional connection session data may also be included in the confirmation message. The push client 215 stores the received session ID, session lifetime, and other connection session information in its database of connection sessions currently supported by the push client 215. The session ID and session lifetime are preferably stored in association with data and parameters associated with the connection session.

At step 313, the push client 215 sends a registration confirmation to the application 213 that had transmitted the request for registration at 303. The registration confirmation can include the session ID and other identifiers for the registered session.

The registration procedure in steps 303-313 described above results in a persistent connection being established between the application 213 and the push server 203 through the push client 215 and the wireless mobile communication network at step 315, the persistent connection being associated with the session ID. In particular, the persistent connection can be used for push data functionality. As such, if an application server 205 sends push application data for an application 213 running on mobile device 201 to push server 203 at step 317, push server 203 determines the session ID associated with the connection session for the mobile device 201 by searching its database for the session ID, and transmits the push application data to the push client 215 of the mobile device using the persistent push data connection session associated with the session ID at step 319. The application server 205 generally sends the application data to the push server 203 with one or more identifiers for the target mobile device (e.g., an MDN and/or hardware ID) and/or target application (e.g., an application ID) the data is destined for. The push server 203 determines the connection session associated with the identifier for the target mobile device 201 received from the application server. The push server 203 pushes the data and associated application ID to the push client and, once the data is received by the push client, the push client 215 forwards the data to the application 213 at step 321. The application 213 can similarly use the connection session to transmit a confirmation of receipt of the push data and/or a heartbeat signal to the push server 203 and application server 205 through push client 215 (steps 323, 325, and 327). In general, the application 213 uses a standard client-server connection to connect to and transmit data and requests to application server 205. However, in one example, the application uses the push data connection session to transmit data and requests to the application server 205 and/or the push server 203 through push client 215.

The connection session established in steps 303-315 remains open for the established session lifetime unless the connection is actively closed by the push server 203. In general, however, the session remains open even if the wireless data link between mobile device 201 and carrier gateway 207 through the mobile communication network is lost or terminated, as shown at step 351. Situations in which the wireless link may be lost or terminated include, for example, mobile device 201 being powered off, mobile device 201 exiting the range of the mobile communication network and/or a WIFI network (e.g., by entering a tunnel or subway, or leaving a mobile or WIFI coverage area), a network outage, the connection being dropped, or the like. If or when the wireless link is re-established (step 353), push client 215 and push server 203 can re-establish the persistent connection session at step 355. To re-establish the persistent connection, the push client 215 sends a request to re-establish the persistent connection session to the push server 203. The request generally includes the session ID of the previously established persistent connection (e.g., the session ID received by the push client 215 at step 311), as well as an identifier for the mobile device 201 (e.g., an MDN and/or hardware ID). In response to receiving the request to re-establish the persistent connection, the push server 203 validates the received session ID and/or identifier for the mobile device. Upon successful validation, the persistent connection is re-established with the same session ID as the session ID used by the connection session of step 315. The push client 215 and push server 203 can thus continue to use the connection session that was established, identified, and registered using the prior link at steps 305-315. In particular, the connection session is used without requiring re-authentication of mobile device 201, re-validation of application 213, or re-registration of a connection session with the push server 203. As a result, push client 215 and push server 203 re-establish the persistent connection using the same connection identifier allocated for the session previously (i.e., the session ID allocated for the connection session at step 309). Because the persistent connection is established using the same connection identifier previously allocated for the session, the push client 215 and push server 203 generally already store the session ID and other session identifier(s) and parameter(s) associated with the session. Application server 205 can send push application data to the push server 203 at step 357, and the push application data is forwarded over the persistent push connection session to the client 215 (step 359) and the application 213 (step 361) using the same connection session ID as was established at steps 303-315. The application 213 can use the re-established persistent connection session to transmit a confirmation of receipt of the push data and/or a heartbeat signal to the push server 203 and application server 205 through push client 215 (steps 363, 365, and 367).

Figure 4:
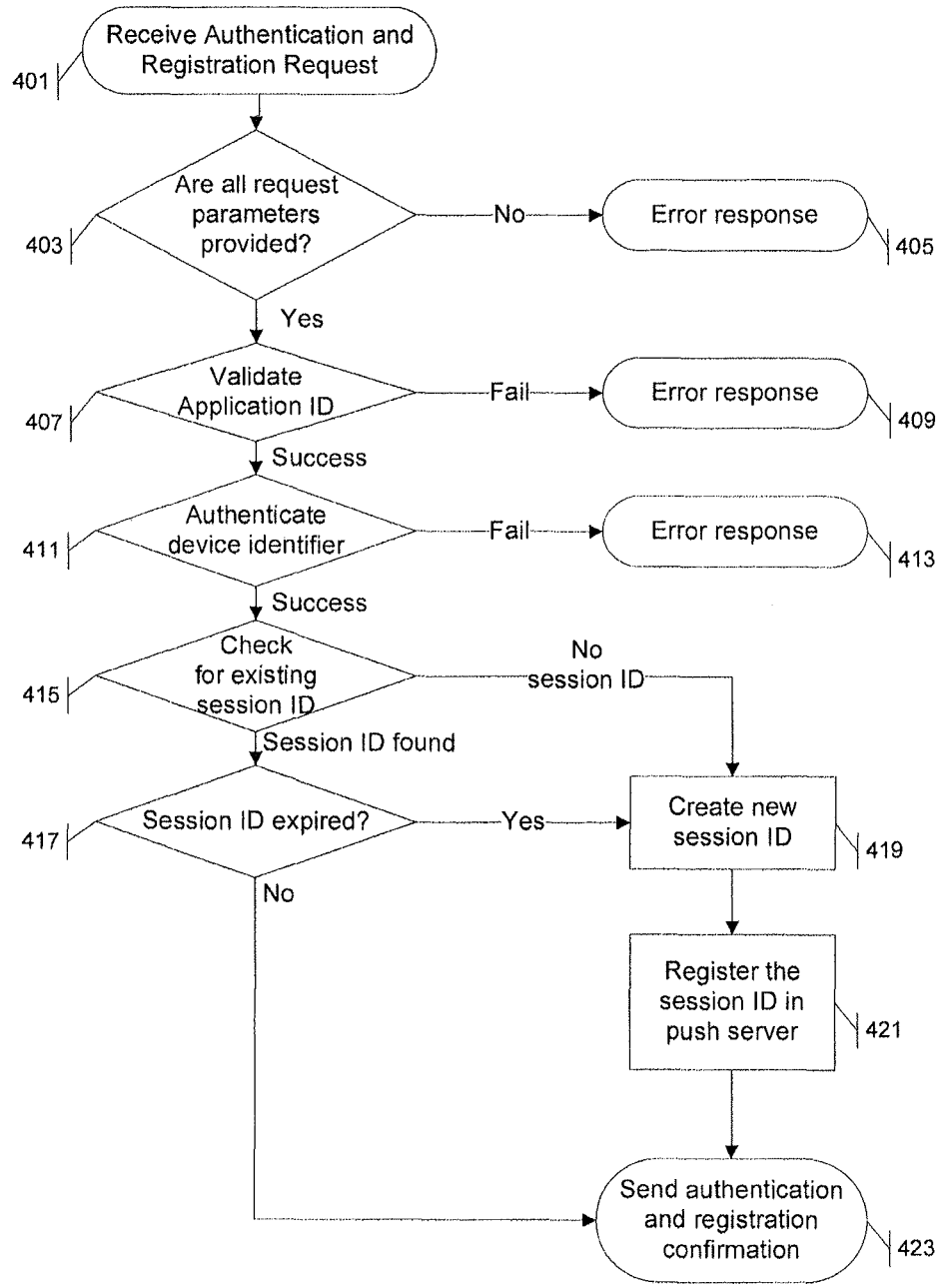
FIG. 4 is a flow diagram of processing performed by a push server in response to receiving an authentication and registration request from a mobile device.

FIG. 4 is a flow diagram illustratively showing the processing performed by push server 203 in response to receiving an authentication and registration request from a mobile device 201 (such as the authentication and registration request received at step 305). In response to receiving the registration query at step 401 in this flow, the push server 203 determines whether the appropriate mobile device parameters (e.g., application ID, device identifier(s), etc.) are included in the request query at step 403. If the appropriate parameters are not included in the query, an error response is sent to mobile device 201 at step 405. However, if the appropriate parameters are included, push server 203 proceeds to validate the application ID included in the registration request at step 407. The validation of the application ID includes verifying whether the received application ID is included in the push server database of applications approved for use with push data service. If the validation of the application ID is not successful, an error response is returned at step 409. If the validation is successful, push server 203 authenticates the mobile device at step 411. The authentication of the mobile device 201 can include verifying that the mobile device's MDN and hardware ID, and/or other device identifiers, are both stored in and associated with each other in the database of the push server 203. Alternatively, the authentication may be performed in substantially the same way as described at step 307 of FIG. 3. If the authentication fails, an error response is transmitted to mobile device 201 at step 413.

If the authentication is successful through step 413, the push server 203 has successfully validated the application ID and authenticated the mobile device 201 and can proceed to opening a connection session for the application 213 running on the mobile device 201. At step 415, the push server 203 begins the session related part of the process by determining whether there are any existing connection sessions for the mobile device 201 by checking whether data associated with any existing session IDs stored in the push server database match the device identifiers received in the request. If no matching session is located, push server 203 creates a new session ID at step 419, and registers the newly created session ID at step 421. As part of the session ID creation and registration processes, push server 203 generates a session lifetime for the session ID, and stores the session ID and session lifetime in the database of the push server 203 along with configuration information for the connection session such as the mobile station identifiers, session start date and time, the application ID, and the like. Once the registration is completed, the push server 203 transmits an authentication and registration confirmation message to mobile device 201 at step 423. The confirmation message includes the session ID, session lifetime, and other appropriate session configuration parameters.

If a matching session is located at step 415, the push server 203 verifies whether the matching session has expired at step 417. If the session has expired, the push server 203 proceeds to step 419 to create a new session ID, followed by registration at 421 and transmission of the confirmation at 423 as discussed above. If the session has not expired at step 417, the push server 203 proceeds to step 423 to transmit the authentication and registration confirmation message to mobile device 201.

The flow diagram of FIG. 4 is one example of a process that may be performed by a push server 203 in response to receiving an authentication and registration request from a mobile device 201. The process of steps 401-423 may be repeated for each authentication and registration request received by the push server 203 from the same application and/or different application(s) running on mobile device 201. However, different processes may be used, including additional steps not shown in FIG. 4, fewer steps than those shown in FIG. 4, or a different ordering of steps than that shown in FIG. 4.

For example, if an authentication server used by push server 203 to perform the authentication and/or validations steps 407 and 411 is down for scheduled maintenance, push server 203 may receive a failure response message indicating a suggested retry delay to wait before repeating the validation and/or authentication request again. If the mobile device 201 has not been used for an extended period of time (e.g., a week or more), additional validation may be performed at step 411, for example to verify additional mobile device identifiers and ensure that the mobile device's parameters and identifiers registered in the push server 203 or in an authentication server match the communication parameters and identifiers used by the device 201.

Figure 5:
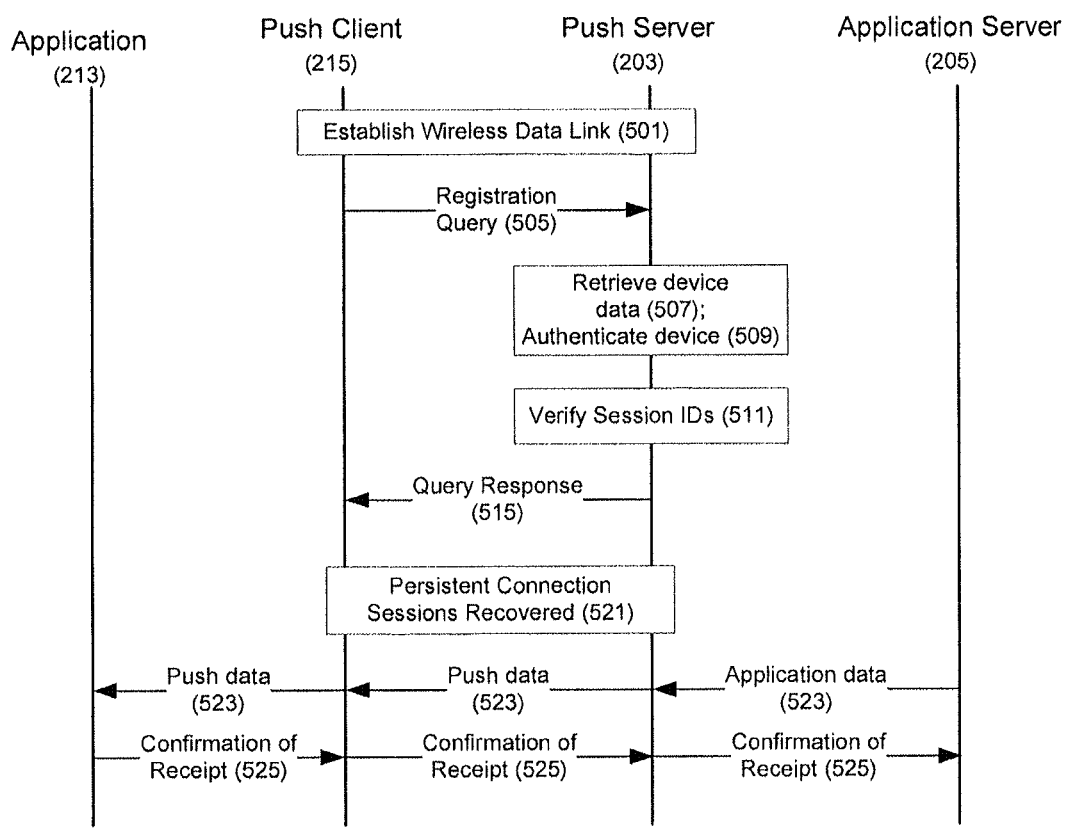
FIG. 5 is a signal flow diagram between a client device and network server for retrieving data on connection sessions used by the client device and network server for push data functionality.

As noted in connection with FIG. 3, push client 215 maintains a database of all connection sessions currently supported by the push client 215, and stores session ID, session lifetime, and other connection data related to new connection sessions in the database (see, e.g., step 311). Push client 215 uses the stored connection session information to respond to queries from applications 213, and to route requests and other transmissions between applications 213 and push server 203. If the stored connection session information is lost, for example if all or part of the database in the memory of mobile device 201 is deleted or erased, the push client 215 may not be able to support currently active connection sessions. In order to retrieve the lost session information, FIG. 5 illustrates an exemplary signal flow between a client device and network servers for retrieving data on current connection sessions for push data functionality.

The mobile device 201 has or establishes a wireless data link with push server 203 through the mobile network, a WIFI network, and/or an other appropriate network (step 501) using processing similar to that discussed earlier regarding step 301. Then, the mobile device 201 can retrieve the session connection information using a registration query to the push server 203.

At step 505, the push client 215 sends the registration query to push server 203. The registration query includes one or more identifiers for the mobile device 201. In one example, the registration query includes the MDN, the hardware ID (MEID), the device IP address, the connection type, the OS type, the firmware, and the model number of the mobile device 201. The registration query has a particular structure, and if any of the identifiers required by the particular structure are missing from the query, the push server 203 can return a failure response.

Upon receiving the registration query and one or more identifiers for the mobile device 201, the push server 203 retrieves connection session registration data for each connection session associated with the identified mobile device 201 from its database at step 507. In addition, at step 509, the push server 203 authenticates the mobile device 201 using the one or more mobile device identifiers received in the registration query, in a manner similar to that described at step 307. If the mobile device authentication is not successful, and/or if no matching connection session registration data is found in the push server database, an error code is returned to the mobile device 201.

However, if the authentication is successful and matching data is found in the database, the push server 203 proceeds with a verification of the session ID of connection session registration data retrieved from the database at step 511. In particular, the push server 203 verifies that the retrieved session ID is still valid by determining whether the session lifetime associated with the session ID has expired. Push server 203 may need to retrieve the current time and/or other system data in order to determine whether the session lifetime has expired. If the connection session is still current, the push server 203 retrieves identifiers for the application(s) registered to the mobile device 201 under the session ID from the push server database. If an identified connection session is expired, the push server 203 repeats the authentication and validation for the connection session (following a procedure similar to that described in steps 307 and 309) using the identifiers for the mobile device 201 received in the query registration and the application ID(s) retrieved from the push server database and associated with the expired session ID. Push server 203 receives a new session lifetime (and, in one example, a new session ID) in response to repeating the authentication and validation, and stores the new session lifetime (and new session ID, if applicable) in its database.

Once the session ID has been verified, the push server 203 generates and transmits to the mobile device 201 a query response message including the verified session ID, associated application ID(s), and other associated connection session data corresponding to the mobile device's identifiers at step 515.

In response to receiving the session registration data, the push client 215 can again use the recovered connection sessions identified in the query response message (step 521). As a result, if an application server 205 transmits push application data to the push server 203, the push server 203 forwards the push application data to the push client 215 and the application 213 using a current connection session for the application (step 523). Similarly, if an application 213 transmits a confirmation of receipt and/or a heartbeat to the push client 213, the push client forwards the confirmation of receipt and/or a heartbeat to the push server 203 and/or the application server 205 using a current connection session for the application (step 525). In addition, if a persistent connection needs to be established for the retrieved session ID, the push client 215 and the push server 203 re-establish a persistent connection for the retrieved session ID not having an active persistent connection. The persistent connection is established using the session ID received in the query response message.

Figure 6:
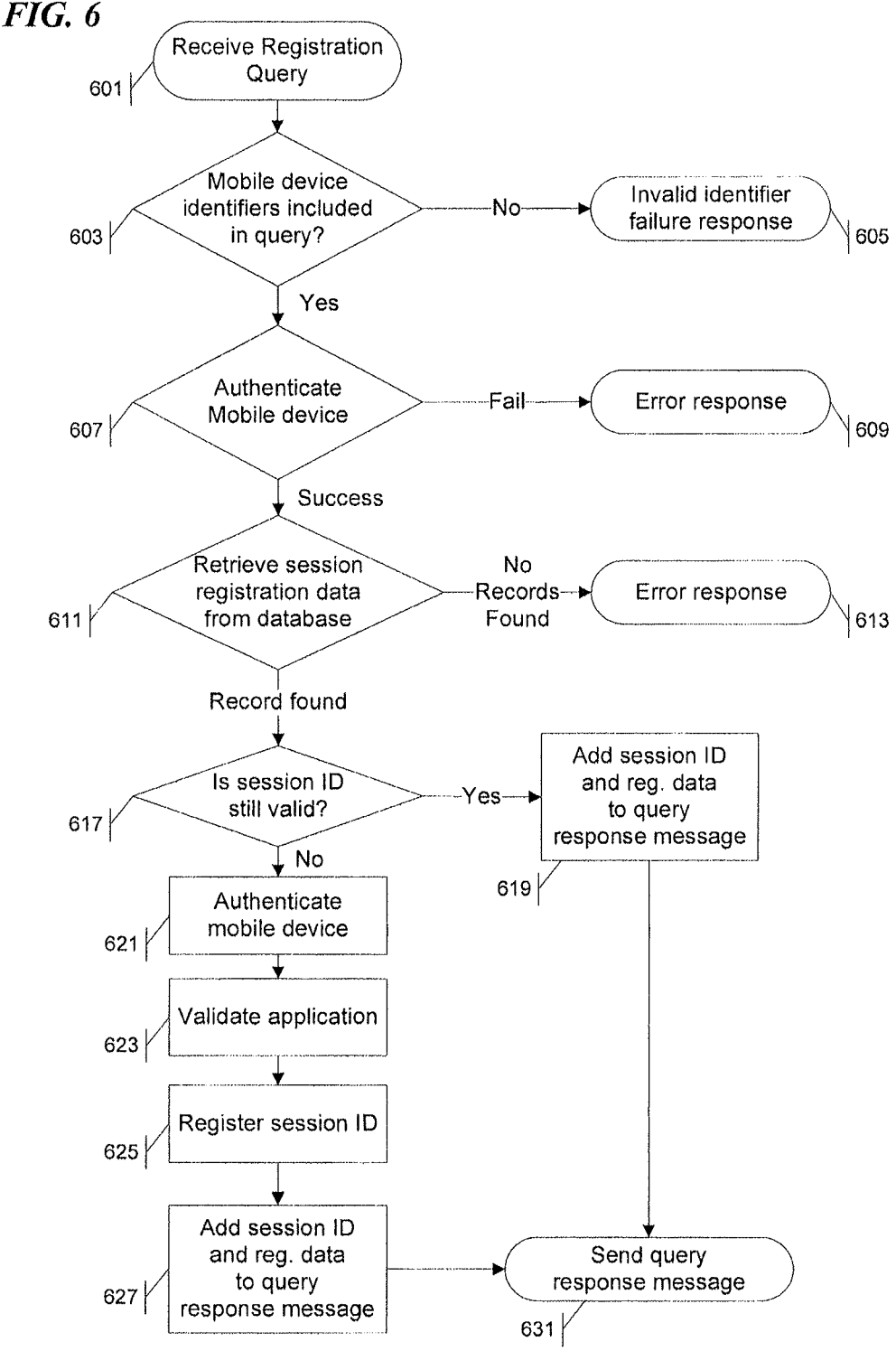
FIG. 6 is a flow diagram of processing performed by a push server in response to receiving a registration query from a mobile device.

FIG. 6 is a flow diagram illustratively showing the processing performed by the push server 203 in response to receiving a registration query from a mobile device 201 (such as the registration query received at step 505). In particular, FIG. 6 shows processing that may be performed by the push server 203 at steps 507-511 of FIG. 5. In response to receiving the registration query at step 601, the push server 203 determines whether the appropriate mobile device identifiers are included in the query at step 603. If the appropriate identifiers are not included in the query, an invalid identifier failure response is sent to mobile device 201 at step 605. However, if the appropriate identifiers are included, the push server 203 proceeds to authenticate the mobile device at step 607. The authentication of the mobile device can include verifying that the mobile device's MDN and hardware ID, and/or other device identifiers, are both stored in and associated with each other in the database of the push server 203 (or in the database of an associated authentication server). Alternatively, the authentication may be performed in substantially the same way as described as step 307 of FIG. 3. If the authentication fails, an error response is transmitted to the mobile device 201 at step 609. The error response indicates that no applications are registered for the device.

If the authentication is successful, the push server 203 retrieves session registration data associated with the mobile device identifiers received in the registration query from the push server database at step 611. Push server can additionally, at step 611, verify that the session registration data retrieved from the data is consistent with the received mobile device identifiers, for example by verifying that each of the device identifiers stored with the session registration data match received device identifiers (e.g., by verifying that each stored and received MDN, IMSI, hardware ID, and/or other identifiers match). If no associated session registration data records are found, an error response is returned to mobile device 201 at step 613. However, if a data record associated with the mobile device identifiers is located, the push server 203 proceeds to step 617.

Push server 203 determines at step 617 whether the session ID of the record is still valid by, e.g., comparing the session lifetime or session end-time associated with the session ID to the current time. If the session ID is still valid, the session ID and registration data is added to a query response message at step 619 for subsequent transmission to the mobile device 201. If the session ID is no longer valid, the push server 203 re-authenticates the mobile device 201, re-validates the application 213 associated with the session ID, and registers a new session lifetime and/or new session ID at steps 621, 623, and 625. Steps 621, 623, and 625 may be substantially similar to steps 307 and 309 of FIG. 3. Following step 625, the push server 203 adds the newly registered session ID and associated registration data to the query response message at step 627 for subsequent transmission to the mobile device 201.

Once one of steps 619 or 627 has been completed, push server 203 transmits the query response message to the mobile device 201 at step 631.

The flow diagram of FIG. 6 is one example of a process that may be performed by push server 203 in response to receiving a registration query from a mobile device 201. However, different processes may be used, including additional steps not shown in FIG. 6, fewer steps than those shown in FIG. 6, or a different ordering of steps than that shown in FIG. 6.

Figure 7:
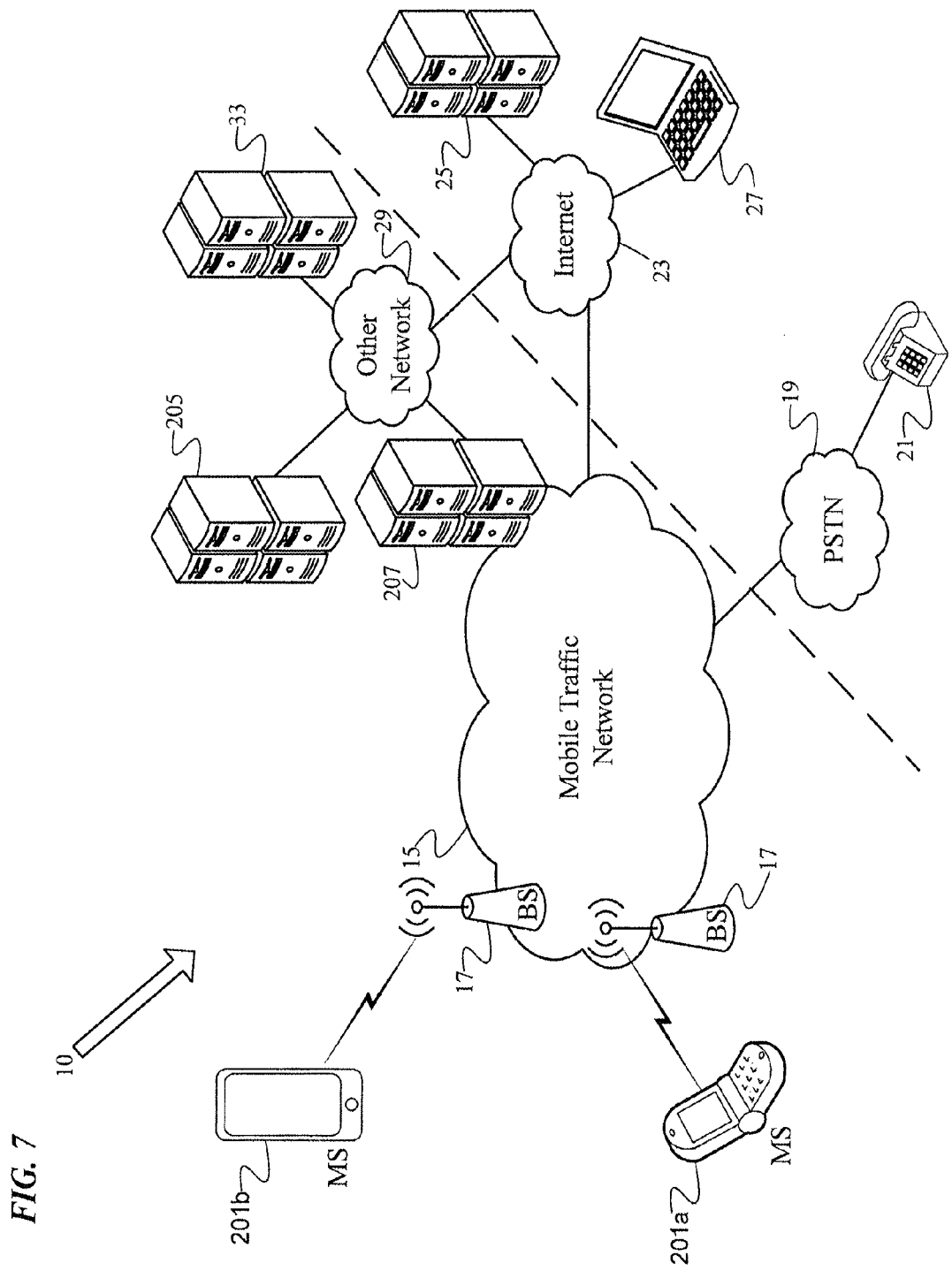
FIG. 7 is a high-level functional block diagram of an example of a system of networks/devices that provide various communications for mobile devices and support an example of the authentication and registration method for a push data service.

FIG. 7 illustrates a system 10 offering a variety of mobile communication services, including communications for device authentication and application registration for push data services used by mobile device applications. The example shows simply two mobile devices (MDs) 201a and 201b as well as a mobile communication network 15. The devices 201a and 201b are examples of mobile devices that may be used for the push data service. However, the network 15 will provide similar communications for many other similar users as well as for mobile devices/users/applications that do not participate in the push data service. The network 15 provides mobile wireless communication services to the devices 201a and 201b as well as to other mobile devices (not shown), for example, via a number of base stations (BSs) 17. The present techniques may be implemented in any of a variety of available mobile networks 15 and/or on any type of mobile device compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile devices 201 are capable of voice telephone communications through the network 15, and for the push data services, the exemplary devices 201a and 201b are capable of data communications through the particular type of network 15 (and the users thereof typically will have subscribed to data service through the network). Alternatively or additionally, the mobile devices 201 may be capable of data communications through a wireless WIFI or other network.

The network 15 allows users of the mobile devices such as 201a and 201b (and other mobile devices or stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile devices 201 via the Internet 23 may be with devices like those shown at 25 and 27 as well as with a variety of other types of devices or systems capable of data communications through various interconnected networks. The mobile devices 201a and 201b of users of the push data service also can receive and execute applications written in various programming languages, as discussed more later.

Mobile devices 201 can take the form of portable handsets, smart-phones or personal digital assistants, although they may be implemented in other form factors. Program applications, including a push client application to assist in the push data service and/or any user applications installed on the device or purchased via on-line services can be configured to execute on many different types of mobile devices 201. For example, a mobile device application can be written to execute on a binary runtime environment for mobile (BREW-based) mobile device, a Windows Mobile based mobile device, Android, I-Phone, Java Mobile, or RIM based mobile device such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile devices 201, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station 17 and over the airlink with one or more of the mobile devices 201, when the mobile devices 201 are within range. Each base station 17 can include a BTS coupled to several antennae mounted on a radio tower within a coverage area often referred to as a "cell." The BTS is the part of the radio network that sends and receives RF signals to/from the mobile devices 201 that are served by the base station 17.

The radio access networks can also include a traffic network represented generally by the cloud at 15, which carries the user communications and data for the mobile devices 201 between the base stations 17 and other elements with or through which the mobile devices communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here for simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more carrier gateways 207 and/or private IP type packet data networks 29 (sometimes referred to as an Intranet), i.e., a private networks. Generally, such systems are part of or connected for communication via the carrier gateways 207 and/or private network 29. A person skilled in the art, however, would recognize that systems outside of the private network could serve the same functions as well. Examples of such systems, in this case operated by the network service provider as part of the overall network 10, which communicate through the carrier gateways 207 and intranet type network 29, include one or more application servers 205, authentication servers 33, billing servers, application validation servers, as well as other servers used for providing the push data communication service.

A mobile device 201 communicates over the air with a base station 17 and through the traffic network 15 for various voice and data communications, e.g. through the Internet 23 with a server 25 and/or through the carrier gateway 207 and network 29 with application servers 205. The mobile devices 201a, 201b may also communication over the air through a WIFI access point or other public network access point, to communicate through the Internet 23 and network 29 with server 25, carrier gateway 207, and/or application servers 205. In particular, mobile device 201 communicates with a carrier gateway (such as carrier gateway 207), which may include push server 203, authentication server 33, other billing or validation servers, and/or any of base stations 17, base transceiver systems of the base stations 17, traffic network 15, data network 29, and other network elements providing access to the carrier network. If the mobile service carrier offers the push data service, the service may be hosted on a carrier operated application server 205, for communication via the networks 15 and 29. Alternatively, the push data service may be provided by a separate entity (alone or through agreements with the carrier), in which case, the service may be hosted on an application server such as server 25 connected for communication via the networks 15 and 23. Servers such as 205, 33, and 25 may provide any of a variety of common application or service functions in support of or in addition to an application program running on the mobile device 201. However, for purposes of further discussion, we will focus on functions thereof in support of the mobile push data service. For a given service, including the push data service, an application program within the mobile device may be considered as a 'client' and the programming at 207, 205, 25 or 33 may be considered as the 'server' application for the particular service. In the example discussed herein, carrier gateway server 207 includes push server 203, while application server 205 may be a standalone server. However, in other examples, push server 203 and/or application server 205 may be implemented on other servers such as servers 33 and 25, or implemented on distributed server systems in communication with one or more of networks 15, 29, and 23.

To insure that the application service offered by server 205 is available to only authorized devices/users, the provider of the application service also deploys an authentication server 33. The authentication server 33 could be a separate physical server as shown, or authentication server 33 could be implemented as another program module running on the same hardware platform as the gateway server 207 or the application server 205. Essentially, when the gateway server (server 207 in our example) receives a service request, authentication and registration request, or other request from an application or push client on a mobile device 201, the gateway server 207 provides appropriate information to the authentication server 33 to allow the authentication server 33 to authenticate the mobile device 201 as outlined herein. Upon successful authentication, the authentication server 33 informs the gateway server 207, which in turn provides access to the service via data communication through the various communication elements (e.g. 29, 15 and 17) of the network 10. A similar authentication function may be provided for data push services offered via the server 25, either by the authentication server 33 if there is an appropriate arrangement between the carrier and the operator of server 25, by a program on the server 25 or via a separate authentication server (not shown) connected to the Internet 23.

To provide push data communication services in accordance with the descriptions herein, gateway server 207 or another server or multi-server system implementing the functionality of push server 203 includes one or more storage devices. The storage devices can be located within server 207, or located outside of server 207 and communicatively connected with server 207. The storage devices store configuration and link data for use by the push server 203, such as push server databases storing data on mobile devices authorized to connect to the push server 203 or to the carrier network, applications authorized to connect to the push server 203 or to the carrier network, and/or connection sessions supported by the push server 203 with one or more mobile devices. The push server databases may include separate databases for each type of data. In one example, a first application database stores information on all applications authorized for push data services on the network, including a list of the application IDs of applications authorized for push data functionality. A second device information database stores information on all mobile devices authorized for use on the network, and includes a record for each authorized device storing the device identifiers, connection identifiers, and any other identifiers or information associated with the device. A third connection information database stores information an all connection sessions supported by the push server 203, and includes a record for each connection session storing the session ID, session lifetime, application ID, device identifiers, and other identifiers or information associated with the connection session. The databases are each stored on one server or several distributed servers of the network.

Push data services rely on a number of applications and modules running on the mobile device 201 and on the push server 203 (in our example, a server application running on gateway server 207). In our example, a connect module running on the push client 215 of the mobile device 201 is configured to establish a persistent connection with a push engine of the push server 203, and to maintain the persistent connection. If the link between the mobile device 201 and base station 17 is lost or terminated due to a network change, the connect module reinitiates the connection as soon as a new link is established and as long as a session ID of a connection session active on the mobile device 201 is valid and not expired. If the session ID expires, the connect module sends a connection query to the push server 203 to get a new session ID and to reinitiate the connection with the Push Engine. If the mobile device 201 resets and the mobile device's memory is cleared as a result of the reset operation, for example in response to a user reset command, the connect module sends a registration query to the push server 203 to retrieve session information (e.g., a session ID) and recover an active persistent connection session (see, e.g., steps 505-521 of FIG. 5). Alternatively or additionally, if the mobile device's memory is not cleared as a result of the reset operation, the connect module may send a connection query to the push server to re-establish a persistent connection using an established session ID (see, e.g., steps 353-355 of FIG. 3).

In our example, the push server 203 includes a push engine and a push controller. When the push engine receives from the connect module a persistent connection request including a valid session ID and the MDN associated with the session ID, the push engine automatically accepts the request, immediately establishes the connection, and proceeds to validate the session ID with the push controller prior to sending any data on the established connection. To validate the connection, the push engine sends a request to the push controller including the received MDN and session ID. The push controller validates the session ID upon receiving the request from the push engine. The push controller performs the validation using the session ID, session lifetime (or session end-times or expiry times), as well as other information related to applications that are registered for a specific MDN in the push server database.

As shown by the above discussion, functions relating to the push data service may be implemented on mobile devices, computers, and servers connected for data communication via the components of a packet data network, as shown in FIG. 7. Although special purpose equipment may be used, such devices also may be implemented using one or more hardware platforms intended to represent a general class of data processing device commonly used to run "client" and "server" programming so as to implement the push client and push server functionality discussed above, albeit with an appropriate network link and connection capabilities for data communication.

Figure 9:
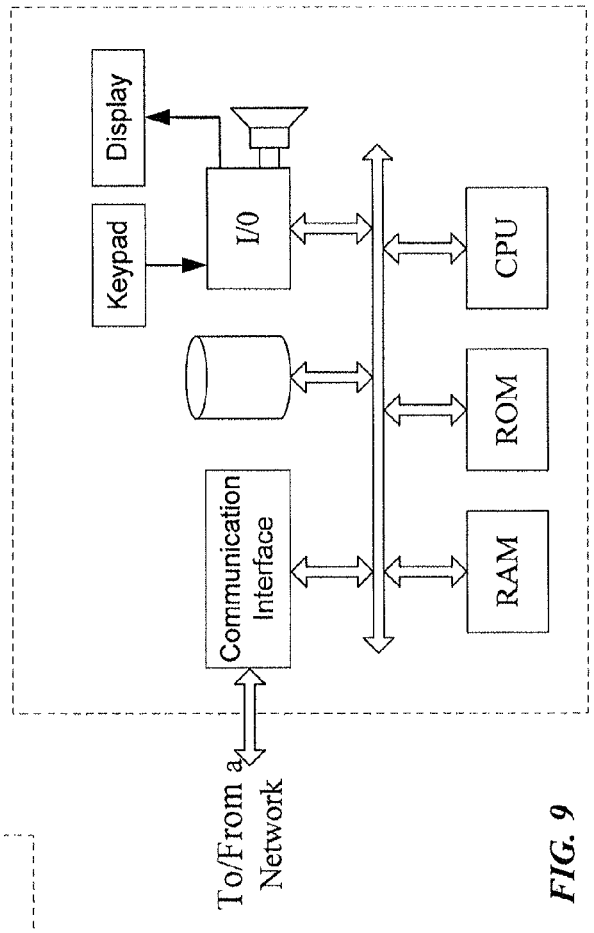
FIG. 9 is a simplified functional block diagram of user terminal such as, in this case, a mobile device or a personal computer.
Figure 8:
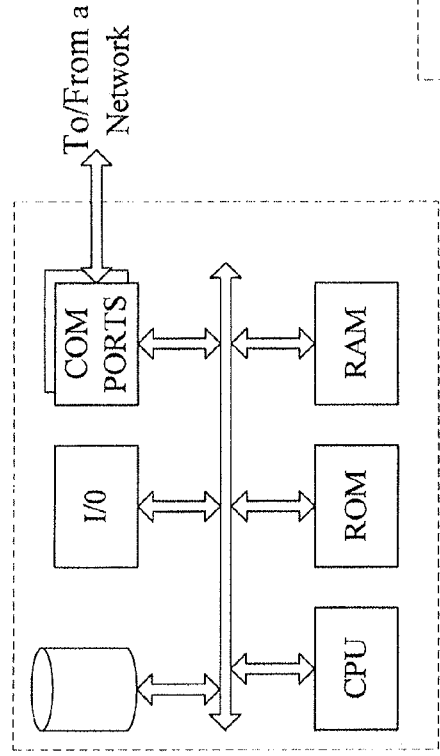
FIG. 8 is a simplified functional block diagram of a computer that may be configured as a host or server, for example, to function as the client server in the system of FIGS. 2 and 7.

FIGS. 8 and 9 provide functional block diagram illustrations of general purpose computer hardware platforms. FIG. 8 illustrates a network or host computer platform, as may typically be used to implement a server. FIG. 9 depicts a device with user interface elements, as may be used to implement a mobile device, portable handset, smart-phone, personal digital assistant or other type of mobile station or terminal, although the device of FIG. 9 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

As known in the data processing and communications arts, a user terminal such as a general-purpose personal computer or a mobile device typically comprises a central processor or other processing device, an internal communication bus, various types of memory or storage media (RAM, ROM, EEPROM, cache memory, disk or flash drives for mass storage, etc.) for code and data storage, and one or more network or communication interfaces or ports for communication purposes. The software functionalities involve programming, including executable code as well as associated stored data, e.g. files used for the user applications, and/or push client application. The software code is executable by the mobile device that functions as the push client. In operation, the code is stored within the mobile device. At other times, however, the software may be stored at other locations and/or transported for loading into the appropriate mobile device system. Execution of such code by a processor of the mobile device enables the mobile device to implement the methodology for push data services, in essentially the manner performed in the implementations discussed and illustrated herein.

Hence, aspects of the methods of push data service outlined above may be embodied in programming. Program aspects of the technology may be thought of as "products" or "articles of manufacture" typically in the form of executable code and/or associated data that is carried on or embodied in a type of non-transitory machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising steps of:
receiving, in a push client running on a mobile device, a first request from an application running on the mobile device to establish a push connection for the application with a push server through a mobile communication network,
the first request including an identifier of the application;
generating and transmitting, from the push client through the mobile communication network, a second request to establish the push connection for the application with the push server,
the second request including the identifier of the application and an identifier of the mobile device;
receiving, from the push server through the mobile communication network, a confirmation message including a session identifier for a persistent communication session established between the push server and the mobile device, through the mobile communication network; and
receiving at least one push communication for the application via the established communication session through the mobile communication network from the push server to the mobile device running the application.

2. The method of claim 1, further comprising:
establishing a first wireless data link between the mobile device and the push server, wherein the steps of transmitting the second request, receiving the confirmation message, and receiving at least one push communication are performed through the first wireless data link;
establishing a second wireless data link between the mobile device and the server, wherein the first and second wireless data links are distinct data links; and
after the second wireless data link is established, receiving at least one push communication for the application via a persistent communication session associated with the session identifier through the second wireless data link from the push server to the mobile device running the application.

3. The method of claim 2, wherein the second wireless data link is established after termination of the first wireless data link.

4. The method of claim 1, wherein the step of receiving at least one push communication via the established communication session comprises:
receiving, by the push client and from the push server, a push communication originated by an application server associated with the application running on the mobile device via the established persistent communication session; and
delivering, by the push client, the received push communication originated by the application server to the application running on the mobile device.

5. The method of claim 1, wherein:
the assigned session identifier remains valid for an extended period; and
the assigned session identifier is valid to establish multiple successive persistent communication sessions between the push server and the mobile device through the mobile communication network during the period for which the session identifier remains valid.

6. The method of claim 5, wherein the extended period exceeds one day.

7. The method of claim 1, further comprising:
receiving, in the push client, a plurality of requests, each request being to establish a push connection for a respective application running on the mobile device with a push server through a mobile communication network and each request including an identifier of the respective application;
generating and transmitting, from the push client through the mobile communication network to the push server, a query including the identifier of the mobile device and the identifier of each of the respective applications; and
receiving, from the push server through the mobile communication network, a response containing a session identifier of a session associated with the identifier of the mobile device included in the query and the identifiers of registered applications assigned to the session identifier.

8. The method of claim 7, wherein each of the identifiers of registered applications assigned to the session identifier contained in the response corresponds to one of the identifiers of the respective applications included in the request such that the push client receives push communications for each of the respective applications via the single session corresponding to the session identifier associated with the identifier of the mobile device.

9. The method of claim 7, wherein:
the response contains:
a plurality of session identifiers of a plurality of sessions associated with the identifier of the mobile device included in the query; and
for each of the plurality of session identifiers, an identifier of a registered application assigned to the respective session identifier; and
each identifier of a registered application assigned to a respective session identifier corresponds to one of the identifiers of the respective applications included in the request such that the push client receives push communications for respective applications via respective sessions corresponding to the session identifiers associated with the identifier of the mobile device.

10. The method of claim 7, wherein:
the identifiers of registered applications contained in the response does not include all of the respective application identifiers contained in the query; and
the method further comprises, for each of the respective application identifiers not represented by the identifiers of registered applications contained in the response, generating and transmitting, from the push client through the mobile communication network, a subsequent request to establish a push connection for the respective application with the push server, the subsequent request including the respective application identifier and the mobile device identifier.

11. A device for receiving push data communication through a mobile network from a push server system, the device comprising:
an interface for communications with the push server system via the network;
at least one processor coupled to the interface;
at least one storage device accessible to the at least one processor; and
programming for execution by the at least one processor, stored in the at least one storage device, wherein execution of the programming by the at least one processor configures the device to perform functions, including functions to:
(a) receive a first request from an application running on the mobile device to establish a push connection for the application with the push server system through the mobile network, the first request including an identifier of the application;

(b) generate and transmit, through the mobile network, a second request to establish the push connection for the application with the push server system, the second request including the identifier of the application and an identifier of the mobile device;

(c) receive, from the push server system through the mobile network, a confirmation message including a session identifier for a persistent communication session established between the push server system and the mobile device, through the mobile network; and (d) receive at least one push communication for the application via the established communication session through the mobile network from the push server system to the mobile device running the application.

12. The device of claim 11, wherein execution of the programming by the at least one processor configures the device to perform further functions to:

establish a first wireless data link between the mobile device and the push server system, wherein the functions of transmitting the second request, receiving the confirmation message, and receiving at least one push communication are performed through the first wireless data link;

establish a second wireless data link between the mobile device and the server, system wherein the first and second wireless data links are distinct data links; and after the second wireless data link is established, receive at least one push communication for the application via a persistent communication session associated with the session identifier through the second wireless data link from the push server system to the mobile device running the application.

13. The device of claim 12, wherein the second wireless data link is established after termination of the first wireless data link.

14. The device of claim 11, wherein the function to receive at least one push communication via the established communication session further comprises functions to:

receive a push communication from the push server originated by an application server associated with the application running on the mobile device via the established persistent communication session; and deliver the received push communication from the application server to the application running on the mobile device.

15. The device of claim 11, wherein:

the assigned session identifier remains valid for a period exceeding one day; and the assigned session identifier is valid to establish multiple successive persistent communication sessions between the push server system and the mobile device through the mobile communication network during the period for which the session identifier remains valid.

16. The device of claim 11, wherein execution of the programming by the at least one processor configures the device to perform further functions to:

receive a plurality of requests, each request being to establish a push connection for a respective application running on the mobile device with a push server system through a mobile communication network and each request including an identifier of the respective application;

generate and transmit a query including the identifier of the mobile device and the identifier of each of the respective applications; and receive a response containing a session identifier of a session associated with the identifier of the mobile device included in the query and the identifiers of registered applications assigned to the session identifier.

17. The device of claim 16, wherein each of the identifiers of registered applications assigned to the session identifier contained in the response corresponds to one of the identifiers of the respective applications included in the request such that the mobile device receives push communications for each of the respective applications via the single session corresponding to the session identifier associated with the identifier of the mobile device.

18. The device of claim 16, wherein:

the response contains:

a plurality of session identifiers of a plurality of sessions associated with the identifier of the mobile device included in the query; and for each of the plurality of session identifiers, an identifier of a registered application assigned to the respective session identifier; and each identifier of a registered application assigned to a respective session identifier corresponds to one of the identifiers of the respective applications included in the request such that the mobile device receives push communications for respective applications via respective sessions corresponding to the session identifiers associated with the identifier of the mobile device.

19. The device of claim 16, wherein:

the identifiers of registered applications contained in the response does not include all of the respective application identifiers contained in the query; and for each of the respective application identifiers not represented by the identifiers of registered applications contained in the response, execution of the programming by the at least one processor configures the device to perform further functions to generate and transmit a subsequent request to establish a push connection for the respective application with the push server, the subsequent request including the respective application identifier and the mobile device identifier.

20. A system, comprising:

a mobile communications network;

a mobile device running a push client; and a push server, wherein:

the push client is configured to:

receive a first request from an application running on the mobile device for a push connection corresponding to the application with the push server through the mobile communications network, the first request including an identifier of the application;

generate and transmit a second request to the push server through the mobile communications network for the push connection corresponding to the application with the push server, the second request including the identifier of the application and an identifier of the mobile device;

receive a confirmation message from the push server through the mobile communications network including a session identifier for a persistent communication session established between the push server and the mobile device;

receive at least one push communication for the application via the corresponding push connection over the established persistent communication session through the mobile communications network from the push server; and forward the at least one push communication to the application; and the push server is configured to:

receive the second request from the mobile device;

authenticate the mobile device upon determining that the identifier of the mobile device contained in the second request is valid;

register the application upon determining that the application identifier contained in the second request is valid;

assign the session identifier to the authenticated mobile device;

establish the persistent communication session; and send the at least one push communication.

* * * * *